US012799883B2

(12) United States Patent
Kurashige et al.

(10) Patent No.: US 12,799,883 B2
(45) Date of Patent: Nov. 17, 2026

(54) TINY TRANSITION METAL INCORPORATED CATALYSTS FOR GASOLINE ENGINE EXHAUST GAS TREATMENTS

(71) Applicant: Johnson Matthey Public Limited Company, London (GB)

(72) Inventors: Wataru Kurashige, Kitsuregawa (JP); Shuhei Nagaoka, Kitsuregawa (JP)

(73) Assignee: Johnson Matthey Public Limited Company, London (GB)

( * ) Notice: Subject to any disclaimer, the term of this patent is extended or adjusted under 35 U.S.C. 154(b) by 531 days.

(21) Appl. No.: 18/465,191

(22) Filed: Sep. 12, 2023

(65) Prior Publication Data

US 2024/0110494 A1 Apr. 4, 2024

Related U.S. Application Data

(60) Provisional application No. 63/377,784, filed on Sep. 30, 2022.

(51) Int. Cl.

*F01N 3/10* (2006.01)
*B01D 53/94* (2006.01)
*B01J 23/83* (2006.01)
*B01J 35/00* (2024.01)

(52) U.S. Cl.

CPC ........... *F01N 3/101* (2013.01); *B01D 53/945* (2013.01); *B01J 23/83* (2013.01); *B01J 35/19* (2024.01); *B01D 2255/1021* (2013.01); *B01D 2255/1023* (2013.01); *B01D 2255/1025* (2013.01); *B01D 2255/2065* (2013.01); *B01D 2255/20738* (2013.01); *B01D 2255/20761* (2013.01)

(58) Field of Classification Search

CPC ... B01J 35/19; B01J 23/83; B01J 23/58; B01J 23/63; B01J 23/8906; B01J 23/8926; B01D 53/945; B01D 2255/1021; B01D 2255/1023; B01D 2255/1025; B01D 2255/2065; B01D 2255/20738; B01D 2255/20761

USPC .................... 502/326, 331; 423/213.5, 239.1

See application file for complete search history.

(56) References Cited

U.S. PATENT DOCUMENTS 6,281,161 B1 * 8/2001 Marsh .................... H01G 4/005 502/262
8,546,296 B2 * 10/2013 Yabuzaki ............. B01J 37/0244 428/116
9,849,443 B2 * 12/2017 Harada .................. B01J 35/613
(Continued)

FOREIGN PATENT DOCUMENTS

EP 2039425 B1 10/2014
JP 4432588 B2 3/2010
(Continued)

*Primary Examiner* — Patricia L. Hailey
(74) *Attorney, Agent, or Firm* — BakerHostetler

(57) ABSTRACT

A three-way catalyst article, and its use in an exhaust system for internal combustion engines, is disclosed. The catalyst article for treating exhaust gas comprising: a substrate comprising an inlet end and an outlet end with an axial length L; a first catalytic region comprising a first platinum group metal (PGM) component and a first transition metal component, wherein the first PGM component comprises platinum (Pt), and the first transition metal component is Fe or Cu, and wherein the molar ratio of Pt and the first transition metal is from 0.2 to 10.0.

19 Claims, 3 Drawing Sheets

(56) References Cited

U.S. PATENT DOCUMENTS

| | | | | |
|---|---|---|---|---|
| 10,022,705 | B2 * | 7/2018 | Kimura | B01D 53/9454 |
| 2003/0100447 | A1 * | 5/2003 | Deeba | B01D 53/865 502/333 |
| 2010/0215557 | A1 * | 8/2010 | Liu | B01J 23/63 502/333 |
| 2015/0352530 | A1 | 12/2015 | Nagao | |
| 2016/0318005 | A1 | 11/2016 | Nakahara | |
| 2020/0078769 | A1 * | 3/2020 | Andersen | B01J 23/44 |

FOREIGN PATENT DOCUMENTS

| | | | |
|---|---|---|---|
| JP | 2012050980 | A | 3/2012 |
| JP | 5804624 | B2 | 11/2015 |
| WO | 2014034524 | A1 | 3/2014 |
| WO | 2015079739 | A1 | 6/2015 |
| WO | 2018042167 | A1 | 3/2018 |
| WO | 2018055393 | A1 | 3/2018 |

* cited by examiner

TINY TRANSITION METAL INCORPORATED CATALYSTS FOR GASOLINE ENGINE EXHAUST GAS TREATMENTS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("NOR"). Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of NOR.

Despite advances in TWC technology, there remains a need for improved catalytic converters for certain engine platforms that simultaneously improve the performance in cold start stage, give better light off performance, as well as at hot transient stage, give better window performance toward air-to-fuel ratio (A/F). Flexible use of Pd and/or Pt in TWC is necessary to mitigate the potential risk of PGM price fluctuation as well as to save and efficient use of natural resources of PGM. Particularly, Pt has disadvantage in the performances of TWC as respect to Pd. This invention solves these problems amongst others.

SUMMARY OF THE INVENTION

One aspect of the present disclosure is directed to a catalyst composition comprising a platinum group metal (PGM) component and a transition metal component, wherein the PGM component comprises platinum (Pt), and the transition metal component is Fe or Cu, and wherein the molar ratio of Pt to the transition metal is from 0.2 to 10.0.

Another aspect of the present disclosure is directed to a catalytic article for treating exhaust gas comprising: a substrate comprising an inlet end and an outlet end with an axial length L; a first catalytic region comprising a first platinum group metal (PGM) component and a first transition metal component, wherein the first PGM component comprises platinum (Pt), and the first transition metal component is Fe or Cu, and wherein the molar ratio of Pt and the first transition metal is from 0.2 to 10.0.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

DETAILED DESCRIPTION OF THE INVENTION

Figure 1:
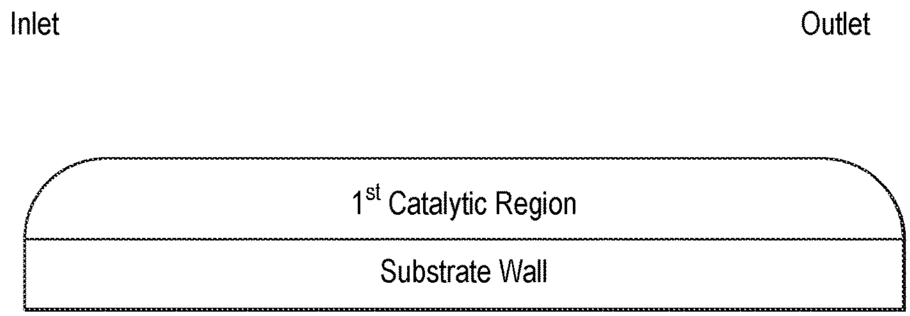
FIG. 1 shows one embodiment according to the present invention, which contains first catalytic region with a length of 100% to the axial length L of the substrate (single layer).

The present invention is directed to the catalytic treatment of combustion exhaust gas, such as that produced by gasoline and other engines, and to related catalysts compositions, catalytic articles, and systems. More specifically, the invention relates the simultaneous treatment of $NO_x$, CO, and HC in a vehicular exhaust system. Although, most of technology development in TWC have been focused on Pd-based catalyst, heavy dependency on the Pd usage makes serious economic and environmental problems like drastic PGM price increment and exhaustion of PGM natural resources. Use of Pt is promising approach to realize flexible utilization of Pd and/or Pt but potential lower catalytic activity of Pt in TWC has been identified as critical technical problem. The inventors have surprisingly discovered that functionalization of Pt-based catalyst by doping of transition metal component of Fe or Cu. The inventors have discovered that TWC potential performance under light off and A/F widow performance tests were improved with this invention. The processes of the present invention also contribute economic benefit as well as environmental sustainability to save PGM natural resources.

One aspect of the present disclosure is directed to a catalyst composition comprising a platinum group metal (PGM) component and a transition metal component, wherein the PGM component comprises platinum (Pt), and the transition metal component is Fe or Cu, and wherein the molar ratio of Pt to the transition metal is from 0.2 to 10.0.

Through intensive research, the inventors have found that by incorporating minor amount of transition metal (such as Fe or Cu) ("TM") into the Pt containing TWC catalyst compositions, these novel compositions have demonstrated excellent catalytic properties (e.g., all the catalytic conversions of THC/NMHC, CO and NO could get improvement by TM doping to Pt-based catalyst as described in this invention).

The molar ratio of Pt to transition metal is based on metal element. In some embodiments, the molar ratio of Pt to transition metal in the catalyst composition can be 0.2 to 5.0, 0.5 to 5.0, 0.2 to 3.0, or 0.2 to 2.0.

In some embodiments, the PGM component can further comprise palladium, rhodium, or a combination thereof. In other embodiments, the catalyst composition is essentially free of other PGM components other than the platinum.

The catalyst composition can further comprise an oxygen storage capacity (OSC) material and/or an inorganic oxide.

The OSC material can be cerium oxide, zirconium oxide, a ceria-zirconia mixed oxide, an alumina-ceria-zirconia mixed oxide, or a combination thereof. More preferably, the OSC material comprises the ceria-zirconia mixed oxide, the alumina-ceria-zirconia mixed oxide or a combination thereof. The ceria-zirconia mixed oxide can further comprise dopants, such as lanthanum, neodymium, praseodymium, yttrium oxides, etc. In addition, the OSC material may function as a support material for the PGM component. In some embodiments, the OSC material comprises the ceria-zirconia mixed oxide and the alumina-ceria-zirconia mixed oxide.

The inorganic oxide is preferably an oxide of Groups 2, 3, 4, 5, 13 and 14 elements. The inorganic oxide is preferably selected from the group consisting of alumina, magnesia, silica, zirconia, barium oxides, and mixed oxides or composite oxides thereof. Particularly preferably, the inorganic oxide is alumina, lanthanum-alumina, zirconia, or a magnesia/alumina composite oxide. One especially preferred inorganic oxide is alumina or lanthanum-alumina.

The OSC material and the inorganic oxide can have a weight ratio of no greater than 10:1; preferably, no greater than 8:1 or 5:1; more preferably, no greater than 4:1 or 3:1; most preferably, no greater than 2:1.

Alternatively, the OSC material and the inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the OSC material and the inorganic oxide can have a weight ratio of no less than 2:1. In further embodiments, the OSC material and the inorganic oxide can have a weight ratio of no less than 10:1. In another further embodiments, the OSC material and the inorganic oxide can have a weight ratio of no less than 20:1 or no less than 30:1. In yet another further embodiments, the OSC material and the inorganic oxide can have a weight ratio of no less than 40:1 or no less than 50:1.

The catalyst composition may further comprise an alkali or alkaline earth metal. In other embodiments, the catalyst composition can be substantially free of the alkali or alkaline earth metal.

The alkali or alkaline earth metal is preferably barium, or strontium, and mixed oxides or composite oxides thereof. Preferably the barium or strontium, where present, is loaded in an amount of 0.1 to 15 wt. %, and more preferably 3 to 10 wt. % of barium or strontium, based on the total weight of the catalyst composition.

Preferably the barium or the strontium is present as $BaCO_3$ or $SrCO_3$. Such a material can be performed by any method known in the art, for example incipient wetness impregnation or spray-drying.

In some embodiments, the Pt loading in the catalyst composition can be 0.2-10 wt. %, 0.5-5 wt. %, or 1-5 wt. %.

TM can be incorporated into the catalyst composition in various ways. In some embodiments, TM can be incorporated into the OSC material as dopant. In other embodiments, TM can be incorporated into the inorganic oxide as dopant. In yet other embodiments, TM can be incorporated into the catalyst composition as simple physical mixture (e.g., physical blend). For example, TM can be incorporated as an oxide to be physically blended with the OSC material and/or the inorganic oxide. In other embodiments, TM can be incorporated into the OSC material framework (e.g., TM doped into the crystal lattice of the OSC solid solution material as formed). In certain embodiments, TM can be incorporated into the catalyst composition in any combinations of the embodiments as described above, for example, in some embodiments, at least some of the TM component can be supported on the inorganic oxide.

In some embodiments, the catalyst composition can no more than 10 wt. %, no more than 5 wt. %, or no more than 2 wt. % of the TM component (based on element). based on the total weight of the catalyst composition.

Throughout the application, “wt. % TM” is calculated based on element

As demonstrated in the Examples below, the catalyst compositions in this aspect can be applied as a TWC catalyst for treating exhaust gas produced by gasoline engines.

Another aspect of the present disclosure is directed to a catalytic article for treating exhaust gas comprising: a substrate comprising an inlet end and an outlet end with an axial length L; a first catalytic region comprising a first platinum group metal (PGM) component and a first transition metal component, wherein the first PGM component comprises platinum (Pt), and the first transition metal component is Fe or Cu, and wherein the molar ratio of Pt and the first transition metal is from 0.2 to 10.0.

First Catalytic Region

The molar ratio of Pt to the first transition metal is based on metal element. In some embodiments, the molar ratio of Pt to the first transition metal in the catalyst composition can be 0.2 to 5.0, 0.5 to 5.0, 0.2 to 3.0, or 0.2 to 2.0.

In some embodiments, the first PGM component can further comprise palladium, rhodium, or a combination thereof. In other embodiments, the first catalytic region is essentially free of other PGM components other than the platinum.

The first catalytic region can further comprise a first oxygen storage capacity (OSC) material and/or a first inorganic oxide.

The first OSC material can be cerium oxide, zirconium oxide, a ceria-zirconia mixed oxide, an alumina-ceria-zirconia mixed oxide, or a combination thereof. More preferably, the first OSC material comprises the ceria-zirconia mixed oxide, the alumina-ceria-zirconia mixed oxide or a combination thereof. The ceria-zirconia mixed oxide can further comprise dopants, such as lanthanum, neodymium, praseodymium, yttrium oxides, etc. The first OSC material may function as a support material for the first PGM component (e.g., as the first PGM support material). In some embodiments, the first OSC material comprises the ceria-zirconia mixed oxide and the alumina-ceria-zirconia mixed oxide.

The first inorganic oxide is preferably an oxide of Groups 2, 3, 4, 5, 13 and 14 elements. The first inorganic oxide is preferably selected from the group consisting of alumina, magnesia, silica, zirconia, barium oxides, and mixed oxides or composite oxides thereof. Particularly preferably, the first inorganic oxide is alumina, lanthanum-alumina, zirconia, or a magnesia/alumina composite oxide. One especially preferred first inorganic oxide is alumina or lanthanum-alumina.

The first OSC material and the first inorganic oxide can have a weight ratio of no greater than 10:1; preferably, no greater than 8:1 or 5:1; more preferably, no greater than 4:1 or 3:1; most preferably, no greater than 2:1.

Alternatively, the first OSC material and the first inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the first OSC material and the first inorganic oxide can have a weight ratio of no less than 2:1. In further embodiments, the first OSC material and the first inorganic oxide can have a weight ratio of no less than 10:1. In another further embodiments, the first OSC material and the first inorganic oxide can have a weight ratio of no less than 20:1 or no less than 30:1. In yet another further embodiments, the first OSC material and the first inorganic oxide can have a weight ratio of no less than 40:1 or no less than 50:1.

The first catalytic region may further comprise a first alkali or alkaline earth metal. In other embodiments, the first catalytic region can be substantially free of the first alkali or alkaline earth metal. The first alkali or alkaline earth metal is preferably barium, or strontium, and mixed oxides or composite oxides thereof. Preferably the barium or strontium, where present, is loaded in an amount of 0.1 to 15 wt. %, and more preferably 3 to 10 wt. % of barium or strontium, based on the total weight of the first catalytic region.

Preferably the barium or the strontium is present as $BaCO_3$ or $SrCO_3$. Such a material can be performed by any method known in the art, for example incipient wetness impregnation or spray-drying.

In some embodiments, the Pt loading in the first catalytic region can be 5-300 g/ft$^3$, 10-200 g/ft$^3$, or 50-150 g/ft$^3$.

TM can be incorporated into the first catalytic region in various ways. In some embodiments, TM can be incorporated into the first OSC material as dopant. In other embodiments, TM can be incorporated into the first inorganic oxide as dopant. In yet other embodiments, TM can be incorporated into the first catalytic region as simple physical mixture (e.g., physical blend). For example, TM can be incorporated as an oxide to be physically blended with the first OSC material and/or the first inorganic oxide. In other embodiments, TM can be incorporated into the first OSC material framework (e.g., TM doped into the crystal lattice of the OSC solid solution material as formed). In certain embodiments, TM can be incorporated into the first catalytic region in any combinations of the embodiments as described above, for example, in some embodiments, at least some of the TM component can be supported on the first inorganic oxide.

In some embodiments, the first catalytic region can no more than 10 wt. %, no more than 5 wt. %, or no more than 2 wt. % of the first TM component (based on element).

As demonstrated in the Examples below, the catalyst article in this aspect can be applied as a TWC catalyst for treating exhaust gas produced by gasoline engines.

Figure 2A:
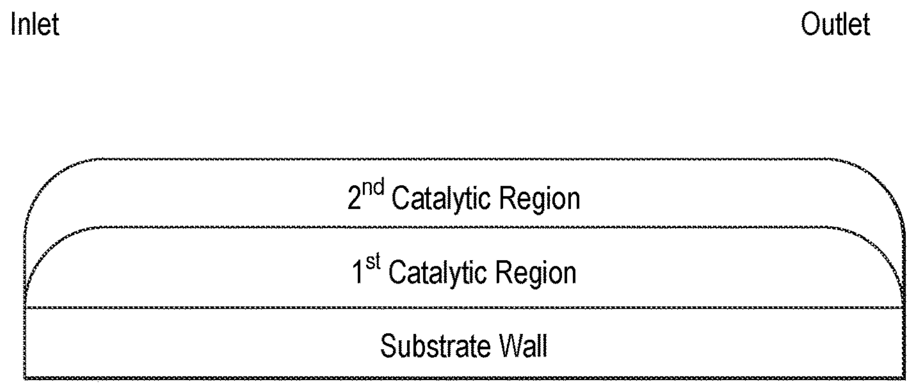
FIG. 2*a* shows one embodiment according to the present invention, the first catalytic region extends 100% of the axial length L, as bottom layer; the second catalytic region extends 100% of the axial length L, as top layer.
Figure 2B:
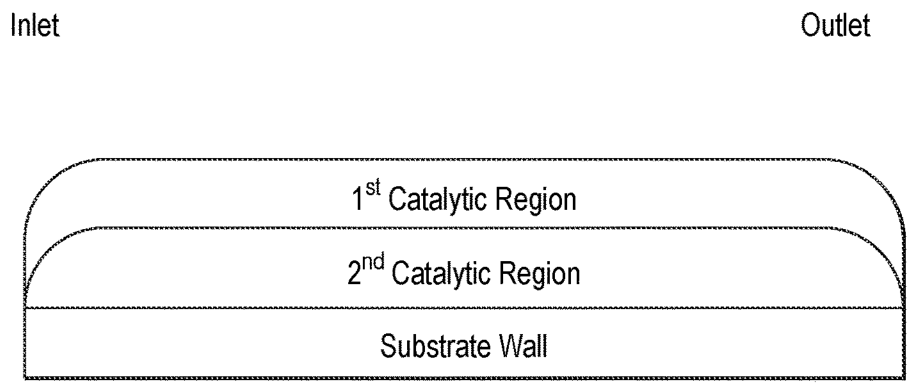
FIG. 2*b* depicts a variation of FIG. 2*a*.

The first catalytic region can extend for 100 percent of the axial length L. (E.g., see FIGS. 1, 2*a*, and 2*b*). In some embodiments, the first catalytic region can extend for 20 to 99%, 30 to 90%, or 40-80% of the axial length L. Alternatively, the first catalytic region can extend for 30 to 70 percent of the axial length L. Preferably, for 40 to 60 percent, more preferably, 45 to 55 percent of the axial length L, (E.g., see FIGS. 3*a*-3*d*).

The total washcoat loading of the first catalytic region can be less than 3.5 g/in$^3$; preferably, less than 3.0 g/in$^3$ or 2.5 g/in$^3$. Alternatively, the total washcoat loading of the first catalytic region can be from 0.5 to 3.5 g/in$^3$; preferably, can be from 0.6 to 3 g/in$^3$ or 0.7 to 2.5 g/in$^3$.

Second Catalytic Region

The catalytic article may further comprise a second catalytic region.

The second catalytic region can further comprise a second PGM component, a second oxygen storage capacity (OSC) material, a second alkali or alkaline earth metal component, and/or a second inorganic oxide.

The second PGM component can be selected from the group consisting of platinum, palladium, rhodium, and a mixture thereof. In some embodiments, the second PGM component can be Pd, Rh or a mixture thereof.

The second OSC material can be cerium oxide, zirconium oxide, a ceria-zirconia mixed oxide, an alumina-ceria-zirconia mixed oxide, or a combination thereof. More preferably, the second OSC material comprises the ceria-zirconia mixed oxide, the alumina-ceria-zirconia mixed oxide, or a combination thereof. In addition, the second OSC material may further comprise one or more of dopants like lanthanum, neodymium, praseodymium, yttrium etc. Moreover, the second OSC material may have the function as a support material for the second PGM component. In some embodiments, the second OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 70:30. Alternatively, the ceria-zirconia mixed oxide also can have a weight ratio of ceria to zirconia less than 50:50, preferably, less than 40:60, more preferably, less than 30:70.

The second OSC material (e.g., ceria-zirconia mixed oxide) can be from 10 to 90 wt. %; preferably, 25-75 wt. %; more preferably, 30-60 wt. %, based on the total washcoat loading of the second catalytic region.

The second OSC material loading in the second catalytic region can be less than 2 g/in$^3$. In some embodiments, the second OSC material loading in the second catalytic region is no greater than 1.5 g/in$^3$, 1.2 g/in$^3$, 1 g/in$^3$, 0.8 g/in$^3$, or 0.7 g/in$^3$.

The second alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the second catalytic region.

It is even more preferable that the second alkali or alkaline earth metal is strontium. The strontium, where present, is preferably present in an amount of 0.1 to 15 wt. %, and more preferably 3 to 10 wt. %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the second catalytic region. It is more preferable that the second alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The second inorganic oxide is preferably an oxide of Groups 2, 3, 4, 5, 13 and 14 elements. The second inorganic oxide is preferably selected from the group consisting of alumina, magnesia, silica, zirconia, barium oxides, and mixed oxides or composite oxides thereof. Particularly preferably, the second inorganic oxide is alumina, lanthanum-alumina, zirconia, or a magnesia/alumina composite oxide. One especially preferred second inorganic oxide is alumina or lanthanum-alumina.

The second OSC material and the second inorganic oxide can have a weight ratio of no greater than 10:1; preferably, no greater than 8:1 or 5:1; more preferably, no greater than 4:1 or 3:1; most preferably, no greater than 2:1.

Alternatively, the second OSC material and the second inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the second OSC material and the second inorganic oxide can have a weight ratio of no less than 2:1. In further embodiments, the second OSC material and the second inorganic oxide can have a weight ratio of no less than 10:1. In another further embodiments, the second OSC material and the second inorganic oxide can have a weight ratio of no less than 20:1 or no less than 30:1. In yet another further embodiments, the second OSC material and the second inorganic oxide can have a weight ratio of no less than 40:1 or no less than 50:1.

The total washcoat loading of the second catalytic region can be less than 3.5 g/in$^3$; preferably, less than 3.0 g/in$^3$ or 2.5 g/in$^3$. Alternatively, the total washcoat loading of the first catalytic region can be from 0.5 to 3.5 g/in$^3$; preferably, can be from 0.6 to 3 g/in$^3$ or 0.7 to 2.5 g/in$^3$.

The second catalytic region can extend for 100 percent of the axial length L. (E.g., see FIGS. 2*a* and 2*b*)

The second catalytic region can extend for 30 to 70 percent of the axial length L. Preferably, for 40 to 60 percent, more preferably, 45 to 55 percent of the axial length L. and most preferably, the total length of the second region and the first region is equal or greater than the axial length L (E.g., see FIGS. 3*a*-3*d*).

Figure 3A:
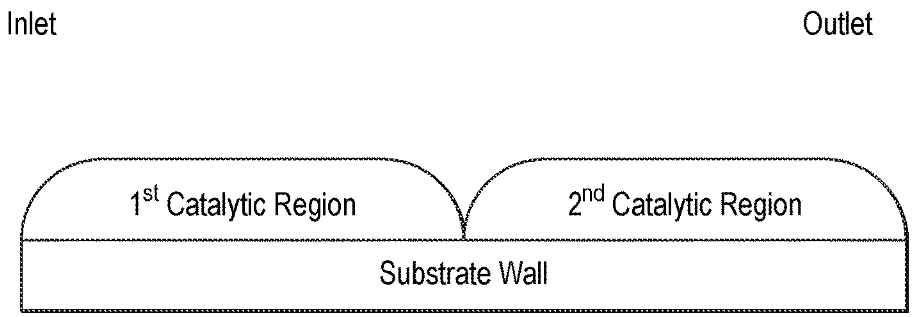
FIG. 3*a* shows one embodiment according to the present invention, the first catalytic region extends less than 100% of the axial length L, from the inlet end; the second catalytic region extends less than 100% of the axial length L, from the outlet end. The total length of the second and the first catalytic region is equal or less than the axial length L.
Figure 3B:
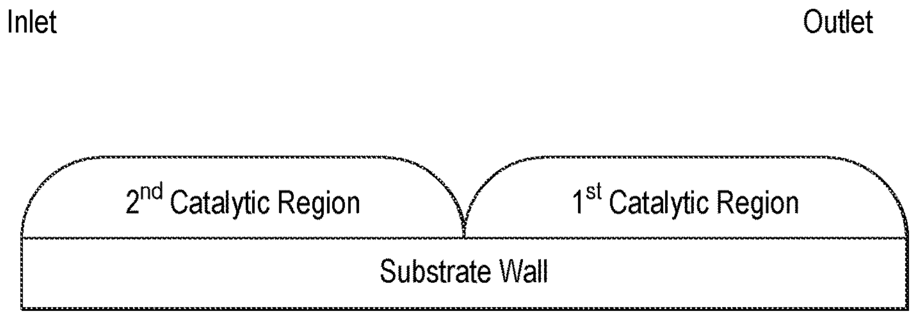
FIG. 3*b* depicts a variation of FIG. 3*a*.
Figure 3C:
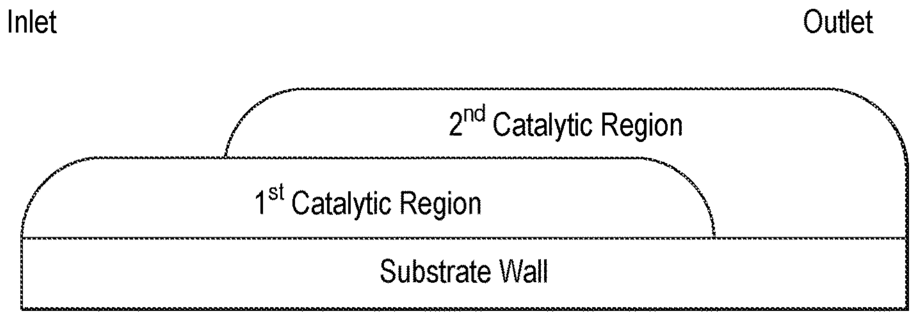
FIG. 3*c* shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L.
Figure 3D:
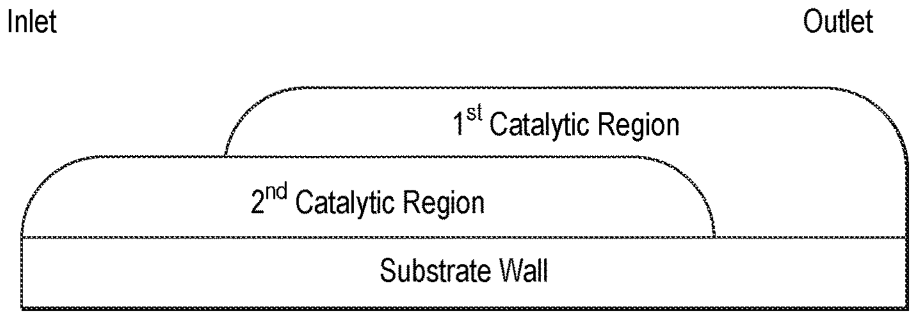
FIG. 3*d* depicts a variation of FIG. 3*c*.

The second catalytic region can overlap with the first catalytic region for 0.1 to 99 percent of the axial length L (e.g., see FIGS. 3*c* and 3*d*, the first catalytic region can overlie the second catalytic region or the second catalytic region can overlie the first catalytic region). Alternatively, the total length of the second catalytic region and the first catalytic region can equal to the axial length L (e.g., see FIGS. 3*a* and 3*b*). In yet another alternative, total the length of the second catalytic region and the first catalytic region can be less than the axial length L, for example, no greater than 95%, 90%, 80%, or 70% of the axial length L.

In some embodiments, the first catalytic region can be supported/deposited directly on the substrate. In certain embodiments, the second catalytic region can be supported/deposited directly on the substrate.

The catalyst article of the invention may comprise further components that are known to the skilled person. For example, the compositions of the invention may further comprise at least one binder and/or at least one surfactant. Where a binder is present, dispersible alumina binders are preferred.

Substrate

Preferably the substrate is a flow-through monolith. Alternatively, the substrate can be a wall-flow filter.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Another aspect of the present disclosure is directed to a method for treating a vehicular exhaust gas containing $NO_x$, CO, and HC using the catalyst article described herein. Catalytic converters equipped with the TWC made according to this method show improved catalytic properties compared to conventional TWC (with the same PGM loading), also show especially improved performance in cold start stage and better THC light off performance (e.g., see Examples 1 and 2; and Tables 2-4).

Another aspect of the present disclosure is directed to a system for treating vehicular exhaust gas comprising the catalyst article described herein in conjunction with a conduit for transferring the exhaust gas through the system.

DEFINITIONS

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g., region) where the difference in composition when comparing one part of the region with another part of the region is 5% or less, usually 2.5% or less, and most commonly 1% or less.

The term "zone" as used herein refers to a region having a length that is less than the total length of the substrate, such as <75% of the total length of the substrate. A "zone" typically has a length (i.e. a substantially uniform length) of at least 5% (e.g. >5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as <5% by weight, preferably <2% by weight, more preferably <1% by weight. The expression "substantially free of" embraces the expression "does not comprise."

The expression "essentially free of" as used herein with reference to a material, typically in the context of the content of a region, a layer or a zone, means that the material in a trace amount, such as <1% by weight, preferably <0.5% by weight, more preferably <0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of g/ft$^3$ on a metal weight basis.

The following examples merely illustrate the invention. Those skilled in the art will recognize many variations that are within the spirit of the invention and scope of the claims.

EXAMPLES

Example 1: Light Off and A/F Window Performance Improvement by Fe Doping

Comparative Catalyst A:

Comparative Catalyst A is a single-layered TWC, coated on a ceramic substrate (400 cpsi, 4.0 mil wall thickness). Catalytic region consists of Pt supported on a washcoat of CeZr mixed oxide, La-stabilized alumina, using Pt nitrate precursor. The washcoat loading of catalytic region was about 2 g/in$^3$ with a Pt loading of 100 g/ft$^3$.

Catalyst B:

Catalyst B is a single-layered TWC, coated on a ceramic substrate (400 cpsi, 4.0 mil wall thickness). Catalytic region consists of Pt supported on a washcoat of CeZr mixed oxide, La-stabilized alumina, using Pt nitrate precursor. The washcoat loading of catalytic region was about 2 g/in$^3$ with a Pt loading of 100 g/ft$^3$ and 0.1 wt. % Fe (calculated as Fe). And the molar ratio of Pt to Fe was 10:1.

Catalyst C:

Catalyst C is a single-layered TWC, coated on a ceramic substrate (400 cpsi, 4.0 mil wall thickness). Catalytic region consists of Pt supported on a washcoat of CeZr mixed oxide, La-stabilized alumina, using Pt nitrate precursor. The washcoat loading of catalytic region was about 2 g/in$^3$ with a Pt loading of 100 g/ft$^3$ and 1.0 wt. % Fe (calculated as Fe). And the molar ratio of Pt to Fe was 0.8:1.

Catalyst D:

Catalyst D is a single-layered TWC, coated on a ceramic substrate (400 cpsi, 4.0 mil wall thickness). Catalytic region consists of Pt supported on a washcoat of CeZr mixed oxide, La-stabilized alumina, using Pt nitrate precursor. The washcoat loading of catalytic region was about 2 g/in$^3$ with a Pt loading of 100 g/ft$^3$ and 5.0 wt. % Fe (calculated as Fe). And the molar ratio of Pt to Fe was ~0.2:1.

Comparative Catalyst A and Catalysts B-D were tested separately over a Synthetic Catalyst Activity Test (SCAT) device. The light off performance was tested in a gas flow of 5 vol. % $H_2O$+15 vol. % $CO_2$+0.2 vol. % $H_2$+1260 ppmC $C_3H_6$+0.6 vol. % CO+0.6 vol. % $O_2$+1000 ppm NO balanced with $N_2$, and temperature ramp is 20° C./min. The conversion of HC, CO and $NO_x$ were calculated from comparing the concentration of the feed gas and the gas at the outlets of the catalysts. Comparative Catalyst A and Catalyst B-D were hydrothermal aged for 4 hours at 1050° C. under redox condition of Table 1.

TABLE 1

| Condition | $C_3H_6$ (%) | $O_2$ (%) | $H_2O$ (%) | $N_2$ | Duration |
|---|---|---|---|---|---|
| Reducing | 2.0 | 0.8 | 8 | Balance | 80 sec |
| Oxidizing | 0 | 20 | 10 | Balance | 20 sec |

The HC, CO $T_{80}$ light off temperatures and $NO_x$ $\eta$=320° C. light off conversion of aged Catalyst A and Catalysts B-D are shown in Table 2. Catalyst C of the present invention gave significantly improved light-off performance when compared with Comparative Catalyst A, with about 15° C. and 8° C. lower $T_{80}$ ($T_{80}$ is the temperature when the conversion reaching 80%) for HC and CO, respectively, and with about 3% higher $\eta$=320° C. ($\eta$=320° C. is the conversion when the temperature reaching 320° C.) for NOR.

TABLE 2

Light Off Performance Results

| | $T_{80}$ (° C.) | | $\eta$ = 320° C. (%) |
|---|---|---|---|
| | HC | CO | $NO_x$ |
| Comparative Catalyst A | 347 | 323 | 42 |
| Catalyst B | 355 | 321 | 41 |
| Catalyst C | 332 | 315 | 45 |
| Catalyst D | 351 | 329 | 35 |

The A/F window performance for Comparative Catalyst A and Catalyst C by SCAT was tested in a gas flow from A/F=15.4 (10 vol. % $H_2O$+14 vol. % $CO_2$+0.17 vol. % $H_2$+1200 ppmC $C_3H_6$+0.5 vol. % CO+1.54 vol. % $O_2$+500 ppm NO balanced with $N_2$) to A/F=14.0 (10 vol. % $H_2O$+14 vol. % $CO_2$+0.7 vol. % $H_2$+1200 ppmC $C_3H_6$+2.11 vol. % CO+0.5 vol. % $O_2$+500 ppm NO balanced with $N_2$) and the temperature was 300° C./min. The conversion of rich CO and rich NO were calculated from comparing the concentration of the feed gas and the gas at the outlets of the catalysts. The CO and $NO_x$ conversion under rich condition of A/F<14.5 of aged Comparative Catalyst A and Catalyst C are shown in Table 2. Catalyst C of the present invention gave significantly improved rich CO and rich $NO_x$ performance when compared with Comparative Catalyst A.

TABLE 3

SCAT A/F Window Performance (Conversion/%) Results

| | A/F = 14.4 | | A/F = 14.3 | | A/F = 14.1 | |
|---|---|---|---|---|---|---|
| | CO | NOx | CO | NOx | CO | $NO_x$ |
| Comparative Catalyst A | 39 | 49 | 29 | 56 | 22 | 61 |
| Catalyst C | 52 | 72 | 38 | 79 | 28 | 83 |

Figure 4A:
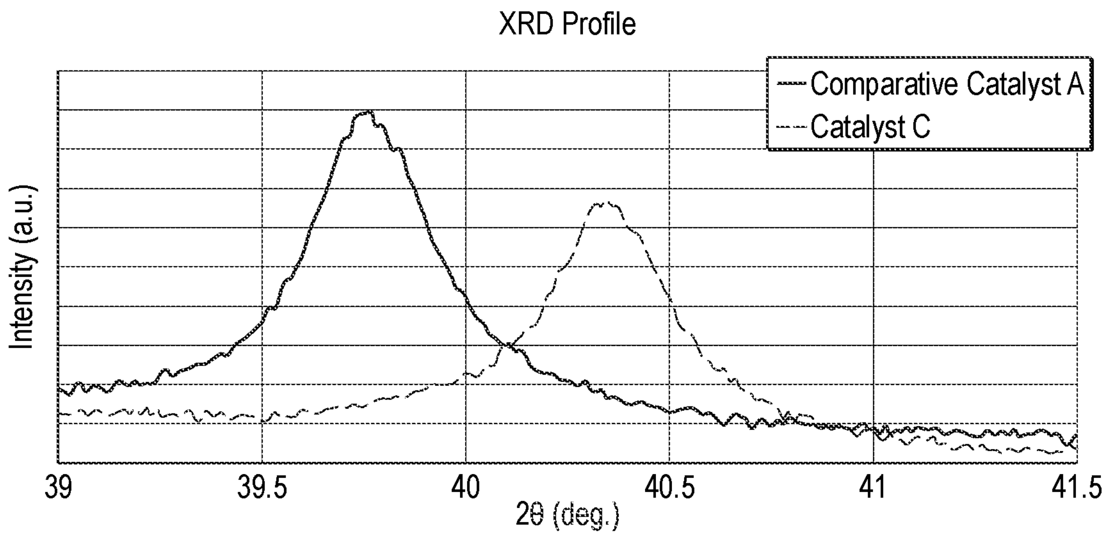
FIG. 4*a* shows Pt state for Comparative Catalyst A and Catalyst C, evaluated by X-ray Diffraction (XRD).

Pt state for Comparative Catalyst A and Catalyst C were evaluated by X-ray Diffraction (XRD). As shown in FIG. 4*a*, while the peak attributed to Pt particle was obtained for Comparative Catalyst A around 39.7 degree, Pt—Fe alloy formation with diffraction peak around 40.3 degree was observed for Catalyst C.

Example 2: Light Off Performance Improvement by Cu Doping

Catalyst E:

Catalyst E is a single-layered TWC, coated on a ceramic substrate (400 cpsi, 4.0 mil wall thickness). Catalytic region consists of Pt supported on a washcoat of CeZr mixed oxide, La-stabilized alumina, using Pt nitrate precursor. The washcoat loading of catalytic region was about 2 g/in$^3$ with a Pt loading of 100 g/ft$^3$ and 0.2 wt. % Cu (calculated as Cu). And the molar ratio of Pt to Cu was 5:1.

Catalyst F:

Catalyst F is a single-layered TWC, coated on a ceramic substrate (400 cpsi, 4.0 mil wall thickness). Catalytic region consists of Pt supported on a washcoat of CeZr mixed oxide, La-stabilized alumina, using Pt nitrate precursor. The washcoat loading of catalytic region was about 2 g/in$^3$ with a Pt loading of 100 g/ft$^3$ and 0.5 wt. % Cu (calculated as Cu). And the molar ratio of Pt to Cu was 2:1.

Catalyst G:

Catalyst G is a single-layered TWC, coated on a ceramic substrate (400 cpsi, 4.0 mil wall thickness). Catalytic region consists of Pt supported on a washcoat of CeZr mixed oxide, La-stabilized alumina, using Pt nitrate precursor. The washcoat loading of catalytic region was about 2 g/in$^3$ with a Pt loading of 100 g/ft$^3$ and 1.0 wt. % Cu (calculated as Cu). And the molar ratio of Pt to Cu was 1:1.

Comparative Catalyst A and Catalysts E-G were tested separately over a Synthetic Catalyst Activity Test (SCAT) device. The light off performance was tested in a gas flow of 10 vol. % $H_2O$+15 vol. % $CO_2$+0.2 vol. % $H_2$+1260 ppmC $C_3H_6$+0.6 vol. % CO+0.6 vol. % $O_2$+1000 ppm NO balanced with $N_2$, and temperature ramp is 20° C./min. The conversion of HC, CO and $NO_x$ were calculated from comparing the concentration of the feed gas and the gas at the outlets of the catalysts. Comparative Catalyst A and Catalyst G-I were hydrothermal aged for 4 hours at 1050° C. under redox condition of Table 1.

The HC, CO $T_{50}$ light off temperatures and $NO_x$ η=300° C. light off conversion of aged Catalyst A and Catalyst F-G are shown in Table 4. Catalyst F of the present invention gave significantly improved light-off performance when compared with Comparative Catalyst A, with about 92° C. and 85° C. lower $T_{50}$ ($T_{50}$ is the temperature when the conversion reaching 50%) for HC and CO, respectively. The similar $NO_x$ conversion performance was observed between Comparative Catalyst A and Catalyst F.

TABLE 4

SCAT Light Off Performance Results

| | $T_{50}$ (° C.) | | η = 320° C. (%) |
|---|---|---|---|
| | HC | CO | $NO_x$ |
| Comparative Catalyst A | 328 | 300 | 17 |
| Catalyst E | 274 | 254 | 24 |
| Catalyst F | 236 | 215 | 16 |
| Catalyst G | 322 | 211 | 6 |

Figure 4B:
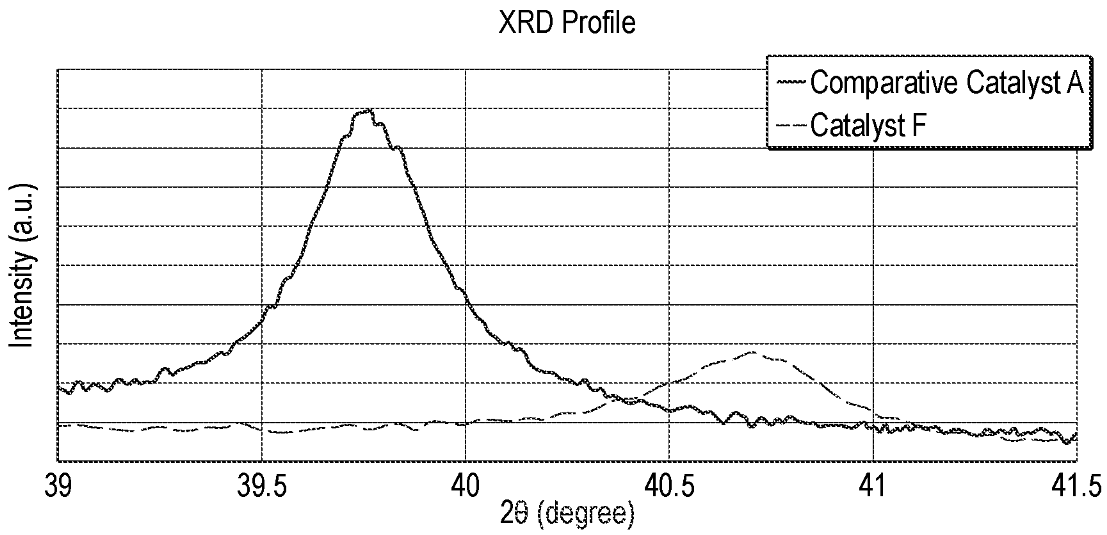
FIG. 4*b* shows Pt state for Comparative Catalyst A and Catalyst F, evaluated by XRD.

Pt state for Comparative Catalyst A and Catalyst F were evaluated by XRD. As shown in FIG. 4*b*, while the peak attributed to Pt particle around 39.8 degree was obtained for Comparative Catalyst A, Pt—Cu alloy formation with diffraction peak around 40.3 degree was observed for Catalyst F.

We claim:

1. A catalyst composition comprising a platinum group metal (PGM) component, a transition metal component, an oxygen storage capacity (OSC) material, and an inorganic oxide, wherein the PGM component comprises platinum (Pt), and the transition metal component is Fe or Cu, wherein the molar ratio of Pt to the transition metal is from 0.2 to 10.0, and wherein the catalyst composition is a three-way catalyst (TWC).

2. The catalyst composition of claim 1, further comprising an alkali or alkaline earth metal.

3. The catalyst composition of claim 2, wherein the alkali or alkaline earth metal is barium, or strontium, and mixed oxides or composite oxides thereof.

4. The catalyst composition of claim 2, wherein the catalyst composition is substantially free of barium.

5. The catalyst composition of claim 1, wherein the PGM component further comprises palladium, rhodium, or a mixture thereof.

6. The catalyst composition of claim 1, wherein the OSC material is selected from the group consisting of cerium oxide, zirconium oxide, a ceria-zirconia mixed oxide, and an alumina-ceria-zirconia mixed oxide.

7. The catalyst composition of claim 1, wherein the inorganic oxide is selected from the group consisting of alumina, magnesia, silica, ceria, barium oxides, and mixed oxides or composite oxides thereof.

8. The catalyst composition of claim 2, wherein the Pt loading is 0.2-10 wt %.

9. The catalyst composition of claim 1, wherein the molar ratio of Pt to the transition metal is from 0.2 to 5.0.

10. A TWC catalytic article for treating exhaust gas produced by a gasoline engine comprising:

a substrate comprising an inlet end and an outlet end with an axial length L;

a first catalytic region comprising a first platinum group metal (PGM) component, a first transition metal component, a first oxygen storage capacity (OSC) material, and a first inorganic oxide, wherein the first PGM component comprises platinum (Pt), and the first transition metal component is Fe or Cu, and wherein the molar ratio of Pt and the first transition metal is from 0.2 to 10.0.

11. The catalytic article of claim 10, wherein the first OSC material is selected from the group consisting of cerium oxide, a ceria-zirconia mixed oxide, and an alumina-ceria-zirconia mixed oxide.

12. The catalytic article of claim 10, wherein the first inorganic oxide is selected from the group consisting of alumina, magnesia, silica, zirconia, lanthana, ceria, neodymia, praseodymia, yttrium oxides, and mixed oxides or composite oxides thereof.

13. The catalytic article of claim 10, wherein the molar ratio of Pt to the first transition metal in the first catalytic region is from 0.2 to 5.0.

14. The catalytic article of claim 10, wherein the first catalytic region contains 0.1-10 wt % of the first transition metal component, based on element.

15. The catalytic article of claim 10, wherein the Pt loading in the first catalytic region is 5-300 $g/ft^3$.

16. The catalytic article of claim 10, wherein the first PGM component further comprises Pd, Rh, or a combination thereof.

17. The catalytic article of claim 10, further comprising a second catalytic region.

18. The catalytic article of claim 17, wherein the second catalytic region comprises a second PGM component.

19. The catalytic article of claim 18, wherein the second catalytic region further comprises a second OSC material and/or a second inorganic oxide.

* * * * *